United States Patent
Dai et al.

(10) Patent No.: US 12,537,898 B2
(45) Date of Patent: Jan. 27, 2026

(54) CALL TRACING WITHIN A CLOUD-BASED CELLULAR NETWORK CORE

(71) Applicant: DISH Wireless L.L.C., Littleton, CO (US)

(72) Inventors: Xiangang Dai, Littleton, CO (US); Kenneth William Weber, Jr., Littleton, CO (US); Dawood Shahdad, Aurora, CO (US)

(73) Assignee: DISH Wireless L.L.C., Littleton, CO (US)

( * ) Notice: Subject to any disclaimer, the term of this patent is extended or adjusted under 35 U.S.C. 154(b) by 240 days.

(21) Appl. No.: 18/298,482

(22) Filed: Apr. 11, 2023

(65) Prior Publication Data

US 2023/0336657 A1    Oct. 19, 2023

Related U.S. Application Data

(60) Provisional application No. 63/331,490, filed on Apr. 15, 2022.

(51) Int. Cl.
*H04M 3/22* (2006.01)
*H04W 84/04* (2009.01)

(52) U.S. Cl.
CPC ....... *H04M 3/2281* (2013.01); *H04W 84/042* (2013.01)

(58) Field of Classification Search
CPC .............. H04M 3/2281; H04W 84/042
See application file for complete search history.

(56) References Cited

U.S. PATENT DOCUMENTS

2020/0136987 A1* 4/2020 Nakfour ............... H04L 41/16
2021/0218652 A1   7/2021 Raut et al.
(Continued)

FOREIGN PATENT DOCUMENTS

JP    2022 007690 A    1/2022

OTHER PUBLICATIONS

"3$^{rd}$ Generation Partnership Project; Technical Specification Group Services and System Aspects; Telecommunication management; Subscriber and equipment trace; Trace control and configuration management (Release 17)", 3GPP Standard; Technical Specification; 3GPP TS 32.422, 3$^{rd}$ Generation Partnership Project (3GPP), Mobile Competence Centre; 650, Route Des Lucioles; F-06921 Sophia-Antipolis Cedex; France, vol. SA WG5, No. V17.6.1 Mar. 23, 2022, pp. 1-232, XP052144777, Retrieved from the Internet: URL: https://ftp.3gpp.org/Specs/archive/32_series/32.422-32422-h61.zip 32422-h61.doc [retrieved on Mar. 23, 2022] clauses 4.1.1.1.1, 4.1.1.1.2, 4.1.1.5 to 4.1.1.8. 4.1.2.1.1, 4.1.2.1.2, 4.1.2.9, 4.1.2.10.

(Continued)

*Primary Examiner* — Phung-Hoang J Nguyen
(74) *Attorney, Agent, or Firm* — Kilpatrick Townsend & Stockton LLP (57) ABSTRACT

Systems and methods for performing a call trace with a cloud-implemented cellular network core are provided. In one example, a method includes: receiving input of a cloud computing region of a cloud computing platform for call trace, identifying a plurality of instantiations of a pod within a cellular network core function of a cellular network core, the cellular network core function being executed on the cloud-computing platform, and executing a call trace for the plurality of instantiations of the pod within the cellular network core function. The cellular network core of a cellular network is implemented across multiple cloud com- (Continued)

puting regions, and the cellular network core is implemented on the cloud computing platform that includes a plurality of cloud computing regions that includes the cloud computing region.

17 Claims, 7 Drawing Sheets

(56) References Cited

U.S. PATENT DOCUMENTS

| | | | |
|---|---|---|---|
| 2022/0116302 A1 | 4/2022 | Gupta et al. | |
| 2023/0004414 A1* | 1/2023 | Lin | H04L 41/0895 |
| 2024/0419571 A1* | 12/2024 | Bruno | G06F 9/5077 |

OTHER PUBLICATIONS

"Network Functions Virtualisation (NFV) Release 3; Architecture; Report on the Enhancements of the NFV architecture towards "Cloud-native" and PaaS", ETSI Draft; ETSI GR NFV-IFA 029, European Telecommunications Standards Institute (ETSI), 650, Route Des Lucioles; F-06921 Sophia-Antipolis; France, vol. ISG—NFV, No. V3.3.1 Jan. 29, 2020, pp. 1-84, XP014374299, Retrieved from the Internet: URL: docbox.etsi.org/ISG/NFV/Open/Publications_pdf/Specs-Reports/NFV-IFA%20029v3.3.1%20-%20GR%20-%20Arch.%20enhancement%20for%20Cloud-native%20and%20Paas%20-%20Report.pdf [retrieved on Jan. 29, 2020].

\* cited by examiner

CALL TRACING WITHIN A CLOUD-BASED CELLULAR NETWORK CORE

CROSS REFERENCE TO RELATED APPLICATIONS

This application claims priority to U.S. Provisional Patent Application No. 63/331,490, filed on Apr. 15, 2022, the disclosure of which is incorporated by reference in its entirety for all purposes.

BACKGROUND

Cellular networks are highly complex. Historically, cellular components tended to be sourced from one particular vendor, thus making communication with a particular component relatively easy. However, with the advent of the open radio access network (O-RAN) approach and component virtualization, components of cellular networks can be sourced from different vendors and can be executed in the form of multiple instances of special-purpose software executed by general-purpose hardware. This arrangement, along with the complexity of modern 5G New Radio (NR) cellular networks, can benefit from improved component communication and monitoring. Embodiments detailed herein can help address such needs.

SUMMARY OF THE DISCLOSURE

Various embodiments are described related to call tracing with a cloud-implemented cellular network core. In accordance with some embodiments, a method for performing a call trace with a cloud-implemented cellular network core is provided. The method may be performed by a cellular network call trace creation system on the cloud computing platform. In one example, the method includes receiving input of a cloud computing region of a cloud computing platform for analysis. A cellular network core of a cellular network is implemented across multiple cloud computing regions, and the cellular network core is implemented on the cloud computing platform that includes a plurality of cloud computing regions that includes the cloud computing region. The method further includes identifying a plurality of instantiations of a pod within a cellular network core function of the cellular network core, executing a call trace for the plurality of instantiations of the pod within the cellular network core function, and receiving call trace data from the cellular network core function, in response to the call trace.

In accordance with some embodiments, a cellular network call trace creation system is provided. The cellular network call trace creation system may be operated on a cloud computing platform. The cellular network call trace creation system may include a user interface, a cloud platform drill engine, a call trace initialization and analysis engine, a call trace function library, and an output engine. The user interface can allow a user to interact with call trace creation system. The cloud platform drill engine can identify instances of network functions (NFs) being executed on the cloud-computing platform and the pods of such NFs. The call trace initialization and analysis engine may initiate one or more call trace related functions by issuing commands to the requested NFs and/or pods of the requested NFs. A library of call trace functions may be stored in call trace function library. The output analysis engine can take the raw output data received from the NFs and/or pods in response to the call trace commands issued by the function analysis engine to the NFs and/or pods and condense the data in a user-friendly manner for presentation via the user interface.

In some embodiments, the cellular network call trace creation system includes one or more processors; and a computer-readable storage medium storing computer-executable instructions that, when executed by the one or more processors, causes the cellular network call trace creation system to: receive input of a cloud computing region of a cloud computing platform for analysis, identify a plurality of instantiations of a pod within a cellular network core function of the cellular network core, execute a call trace for the plurality of instantiations of the pod within the cellular network core function, and receive call trace data from the cellular network core function in response to the call trace.

In some embodiments, a non-transitory processor-readable medium is described. The medium may include processor-readable instructions configured to cause one or more processors to perform a call trace with a cloud-implemented cellular network core. The medium may include processor-readable instructions configured to cause one or more processors to receive input of a cloud computing region of a cloud computing platform for analysis. The medium may include processor-readable instructions configured to identify a plurality of instantiations of a pod within a cellular network core function of the cellular network core. The medium may comprise processor-readable instructions configured to executing a call trace for the plurality of instantiations of the pod within the cellular network core function. The medium may include processor-readable instructions configured to receiving call trace data from the cellular network core function in response to the call trace.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The virtualization of cellular network components, such as in 5G New Radio (NR) cellular networks can allow for at least some cellular network components to be implemented on a cloud-computing platform. Therefore, rather than having special-purpose hardware operated by a cellular network provider, special-purpose software can be executed on a cloud-computing platform to perform the function of the cellular network component, such as a function within the cellular network core or a component of the radio access network (RAN), such as a centralized unit (CU).

Implementing components of a cellular network using a cloud-computing platform can have significant advantages. The cloud computing platform can have a large amount of computing and storage capability such that when additional processing capabilities, storage capabilities, or both are needed by the cellular network, they can be readily provisioned. For example, if demand requires an adjustment to the cellular network, such as the addition of another CU, no physical changes may be needed, rather a new CU instantiation can be created on the cloud-computing network and, following configuration, can begin functioning as part of the cellular network almost immediately.

A cellular network that is partially executed on the cloud results in many instantiations of the same function servicing different portions of the cellular network or serving as a back-up in case of failure. For example, hundreds of instantiations of CUs may be executed across different cloud computing instances and cloud computing data centers of the cloud computing network to serve different distributed units (DUs) of the cellular network. Similarly, within the core of the cellular network, a particular function or pod of a function may be instantiated many times over, such as to handle the processing load being placed on the cellular network by calls.

Further, on a cellular network, the ability to perform "call tracing" may be needed. Due to the complexity of cellular networks, if end users are having difficulty making or receiving phone calls, an investigation may need to be performed into the issue to determine if a fault lies within the handling of calls within the cellular network core. Call tracing allows communications between cellular network core components to be gathered, output, and analyzed. Within a 5G NR cellular core, call tracing can involve monitoring the communications between particular network functions that are part of a call flow.

The virtualization of components along with execution on a cloud computing platform can make it difficult to locate, monitor, and test the call flow for a particular UE via particular network functions. Embodiments detailed herein are focused on tracing calls for a particular UE within a virtualized cloud-based cellular network core.

Figure 1A:
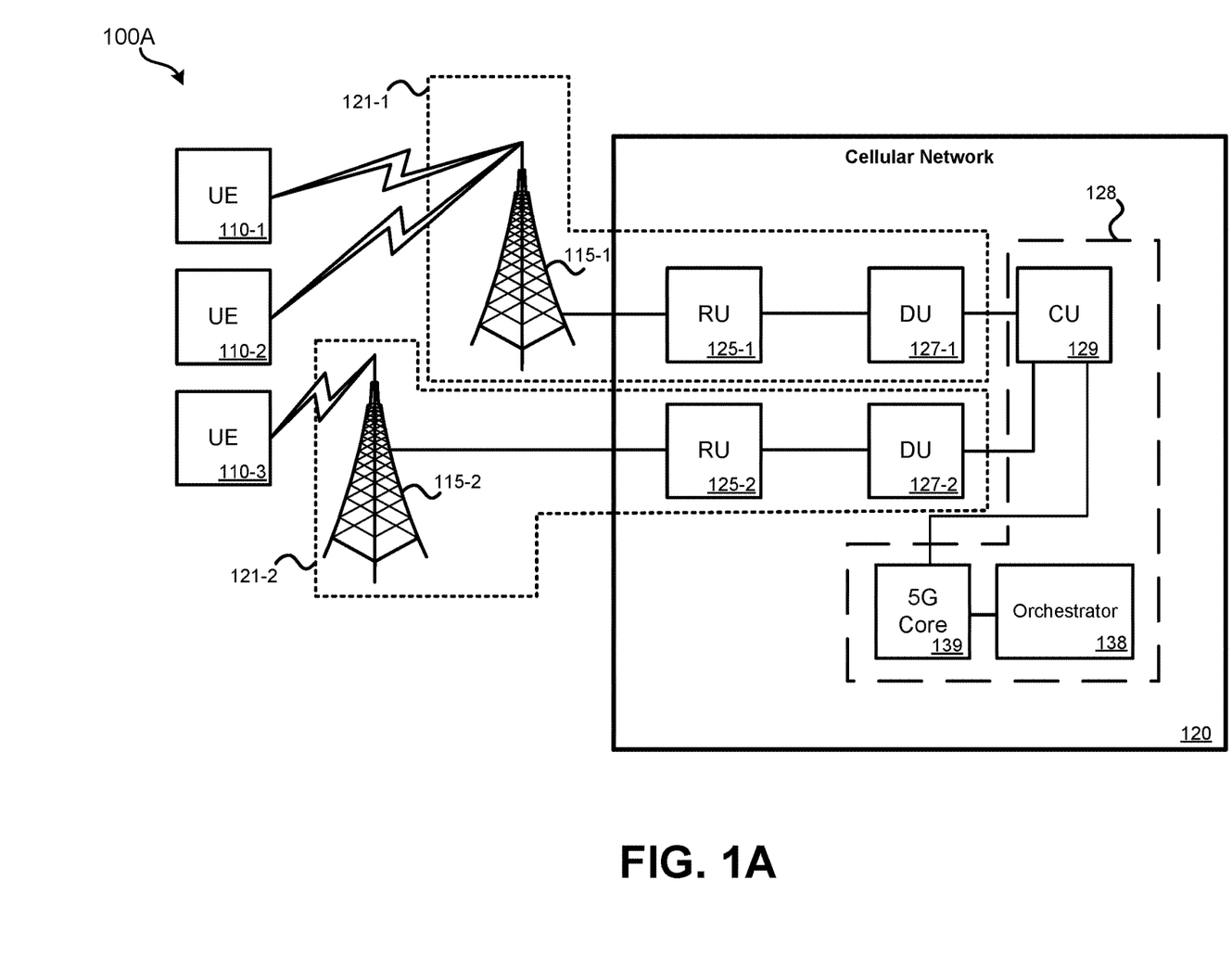
FIG. 1A illustrates an embodiment of a 5G New Radio (NR) cellular network.

Further detail regarding such embodiments and other embodiments is provided in relation to the figures. FIG. 1 illustrates an embodiment of a cellular network system 100A ("system 100A"). FIG. 1 represents an embodiment of a cellular network which can accommodate the cloud-based architecture of FIG. 2. System 100A can include a 5G New Radio (NR) cellular network; other types of cellular networks, such as 6G, 76, etc. may also be possible. System 100A can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations are illustrated: base station equipment 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100A can include many (e.g., thousands) of base stations and many CUs and 5G core 139. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139.

Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100A, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 1B:
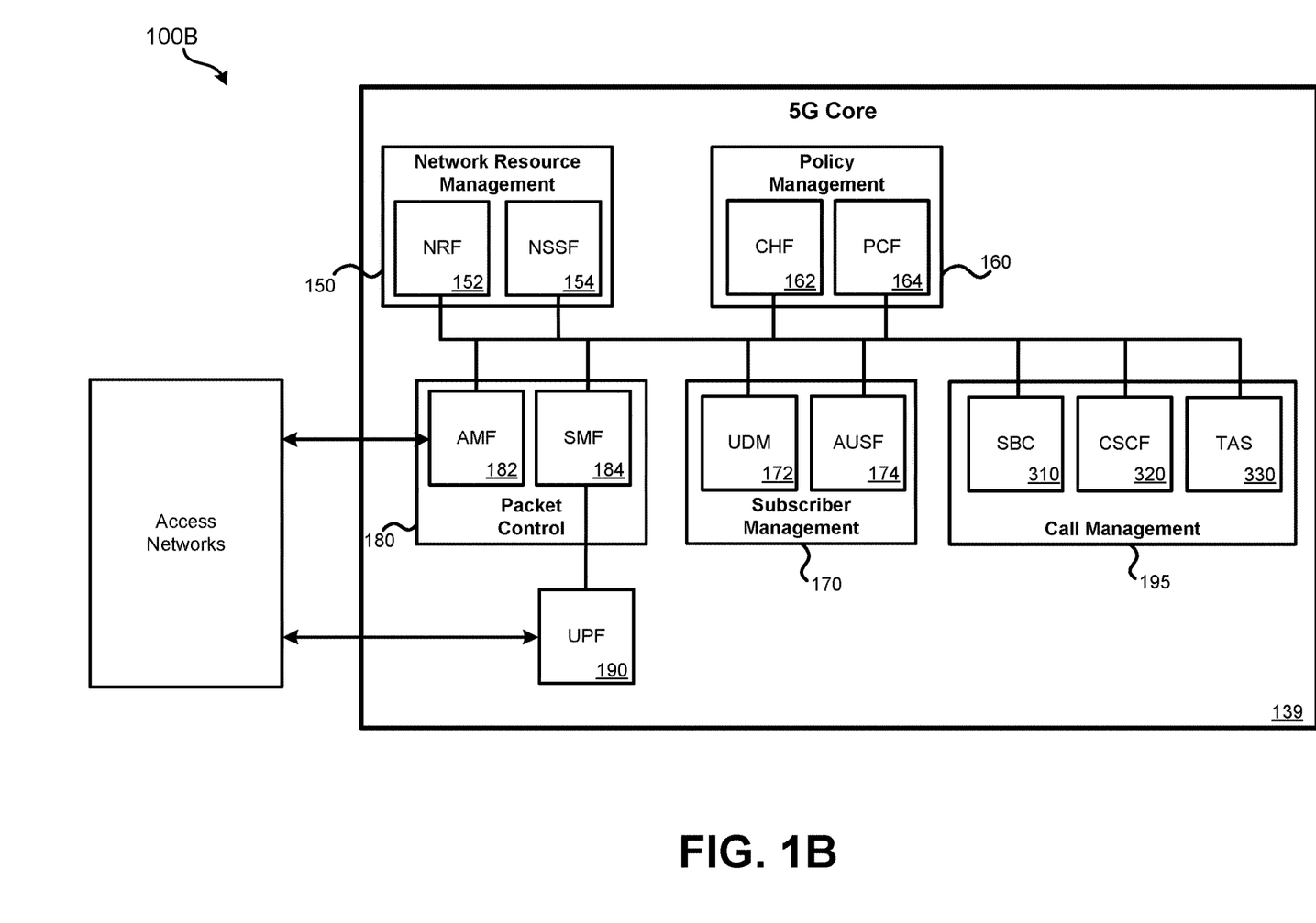
FIG. 1B illustrates an embodiment of 5G core of the cellular network.

Further detail regarding native 5G Core 139 is provided in relation to embodiment 100B of FIG. 1B. 5G core 139, which can be physically distributed across data centers or located at a central national data center (NDC), can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

As shown in FIG. 1, 5G core 139 resides on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

Figure 2:
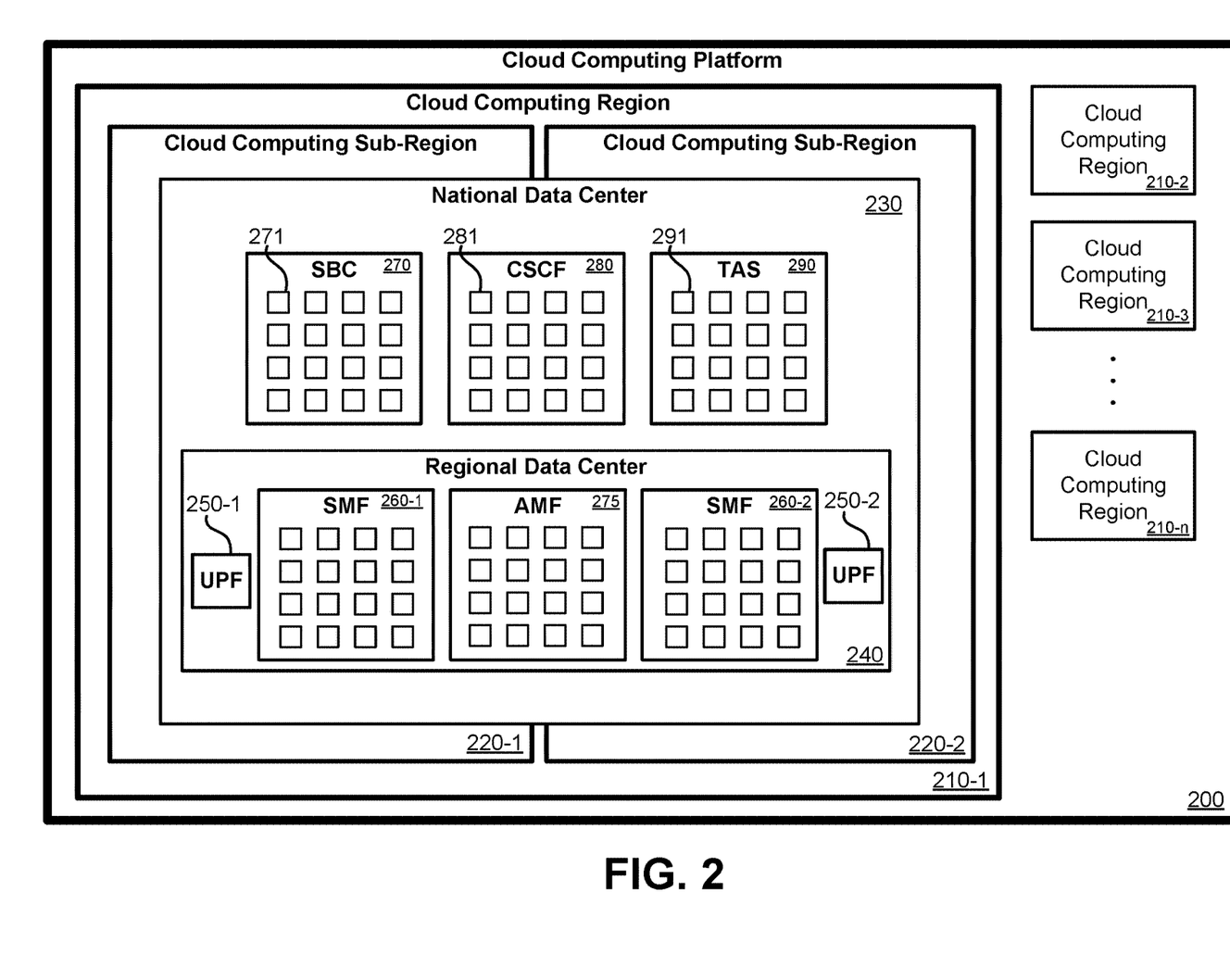
FIG. 2 illustrates an embodiment of a 5G core network topology on a cloud-computing platform.

FIG. 2 illustrates an embodiment of a 5G core network topology on cloud computing platform 200. Cloud computing platform 200 can be logically and physically divided up into various different cloud computing regions 210. Each of cloud computing regions can be isolated from other cloud computing regions to help provide fault tolerance and stability. Further, each of cloud computing regions 210 may provide superior service to a particular geographic region based on physical proximity. For example, cloud computing region 210-1 may have its datacenters and hardware located in the northeast of the United States while cloud computing region may have its datacenters and hardware located in California. For simplicity, the details of the cellular network as executed in only cloud computing region 210-1 is illustrated. Similar components may be executed in other cloud computing regions of cloud computing regions 210 (210-2, 210-3, 210-n).

Each of cloud computing regions 210 may include two or more cloud computing sub-regions 220. Each of cloud computing subregions 200 can allow for redundancy that allows for fail-over protection. Such as, if a particular cloud computing sub-region experiences an outage, another cloud computing sub-region within the same cloud computing region can continue functioning and providing service. If the cloud computing platform used is Amazon Web Services (AWS), cloud computing sub-regions may be referred to as "availability zones." For example, a database that is maintained as part of NDC 230 may be replicated in each cloud computing sub-region; therefore, if one of cloud computing sub-regions 220 fail, a copy of the database remains up-to-date and available, thus allowing for continuous or near continuous functionality.

In the topology of a 5G NR cellular network, 5G core functions of 5G core 139 can logically reside as part of a national data center (NDC). NDC 230 can be understood as having its functionality existing in multiple (e.g., two, three, or more) cloud computing sub-regions 220 within cloud computing region 210-1. This arrangement allows for load-balancing, redundancy, and fail-over. Within NDC 230, multiple regional data centers (RDCs) can be logically present, of which a single RDC is illustrated as RDC 240. Each of such one or more regional data centers may execute 5G core functions for a different geographic region or group of RAN components. As an example of 5G core components that can be executed within an RDC, such as RDC 240, may be: UPFs 250, SMFs 260, and AMFs 275. While instances of UPFs 250 and SMFs 260 may be executed on one of cloud computing sub-regions 220, SMFs 260 may be executed across multiple cloud computing sub-regions 220 for redundancy, processing load-balancing, and fail-over.

Each network function can include multiple pods. A "pod" refers to a software sub-component of the network function. For simplicity of FIG. 2, each of SMFs 260 and AMF 275 are shown as including sixteen pods each. This number is merely an example; fewer or greater numbers of pods may be part of the respective 5G core functions. Further, due to space concerns in FIG. 2, no pods are illustrated as part of UPFs 250; UPFs may also include some number of pods that function together to perform the functions of UPF. While three exemplary network functions are illustrated as part of 5G core 139, as indicated in FIG. 1B, various other network functions can additionally or alternatively be present.

Various NFs may be present within NDC 230 but not part of an RDC, such as RDC 240. For example, one or more instances of SBC 270, CSCF 280, and TAS 290 can reside with NDC 230, but are not part of an RDC. Each of these NFs, can include one or more pods. By way of example only, sixteen pods are illustrated as part of each of SBC 270, CSCF, 280, and TAS 290; fewer or greater numbers of pods may be present in other embodiments. Pod 271 is part of SBC 270; pod 281 is part of CSCF 280; and pod 291 is part of TAS 290.

On a cloud-computing platform, processing capabilities can be divided up into virtualized processing instances. Each processing instance may be allocated up to a fixed amount of processing resources. Therefore, a processing instance can be thought of as a physical processor that has a maximum limit on the amount of processing it can perform over a given time. One or more pods of a network function may be executed on a processing instance of the cloud computing platform. For example, various pods of SBC 270, such as pod 271, can be executed by different processing instances of the cloud-computing platform.

As can be seen in FIG. 2, when a significant number of RDCs, NDCs, and cloud computing regions 210 are considered as part of cloud computing platform 200, the number of functions executed across different NDC and RDC instances on cloud computing platform 200 can be high. A user attempting to monitor the health of such a cloud-based cellular network may have a significant amount of "drilling" and querying to do. Drilling refers to locating the instance of a network function that is desired to be queried. For example, an administrator may desire to perform various health checks on the pods of a particular network function that operates in a particular cloud computing sub-region.

Figure 3:
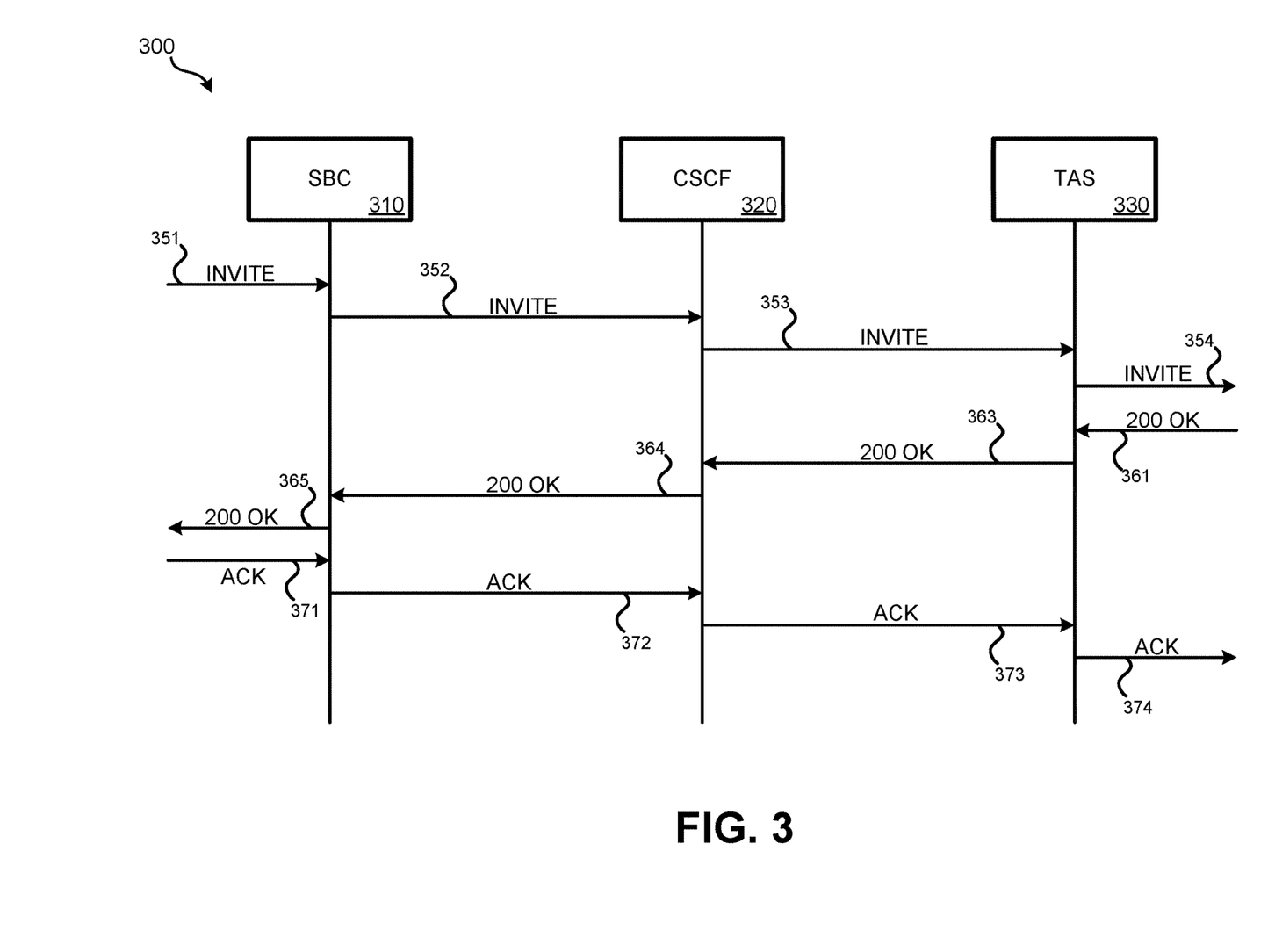
FIG. 3 illustrates an embodiment of a call flow initiated on a cloud-based 5G NR cellular network.

FIG. 3 illustrates an embodiment 300 of a call flow initiated on a cloud-based 5G NR cellular network. On a 5G NR cellular network, various core functions need to be invoked for handling a phone call. The call flow of embodiment 300 illustrates three 5G core functions that function as part of 5G core 139: session border control 310 ("SBC 310"); call session control function 320 ("CSCF 320"); and telephony application server 330 ("TAS 330"). In the example of embodiment 300, a call originates from a UE that is communicating on the cellular network, such as cellular network 120. The call flow of embodiment 300 can involve three messages that are exchanged between the UE (via the RAN), SBC 310, CSCF 320, TAS 330, and the recipient UE on the cellular network (or other telephony network on which the recipient of the call resides).

SBC 310 can help secure voice over IP (VOIP) infrastructure to allow a call to function properly over the cellular network. CSCF 320 manages signaling from the UE to various cellular network services and other networks. TAS 330 provides telephony services such as call forwarding, voicemail, and voice conference bridges.

From the UE, invite message 351 may be sent. Invite message 351 may be received by SBC 310. Invite 352 may be sent from SBC 310 to CSCF 320. Invite 353 may be sent from CSCF 320 to TAS 330. TAS 330 may send invite 354 to the telephony system on which the recipient UE resides. In response to a success connection, a status response code referred to as "200 OK" may be sent by the recipient UE or recipient telephony system. 200 OK message 361 may be received by TAS 330 servicing the originating UE, 200 OK message 363 may be sent by TAS 330 to CSCF 320, which may send 200 OK message 364 to SBC 310, which may send 200 OK message 365 to the originating UE. In response to 200 OK message 365, acknowledgment message 371 may be sent from the originating UE to SBC 310, which may send acknowledgment message 372 to CSCF 320, which may then send acknowledgment message 373 to TAS 330, which may then send acknowledgment message 374 to the recipient UE or the recipient telephony system.

This call flow may be happening over a time period for a high number of UE across the cellular network. Therefore, the call flow may be on-going for hundreds or thousands of UE at any given time. Due to the high volume of data being exchanged between network functions, a call trace may perform only basic filtering to obtain information on messages exchanged between functions. For example, when a call trace is established at a given network function, messages may be able to be filtered based on the source from which the message originated, but potentially no other filtering at this point. Additional filtering can be performed by another component after the obtained data has been output and stored.

A call trace may be used to diagnose whether a problem is present in how phone calls are being handled by the cellular core of the cellular network. In embodiment 300, many handoffs and communication within the 5G core is needed in order to complete a single call—as such, there are a myriad of places where a call could be dropped or negatively affected. Further, embodiment 300 does not factor in the complexity of implementation of a call on a cloud-implemented cellular network. Referring to FIG. 2, many instantiations of SBC 310, CSCF 320, and TAS 330 may be present across cloud computing sub-regions and within NDC 230. For example, referring to FIG. 2, each of RDCs 240 may include these network functions in addition to those illustrated. The call flow of embodiment 300 is merely representative. In other embodiments, additional or fewer network functions may be involved in completing a phone call.

Figure 4:
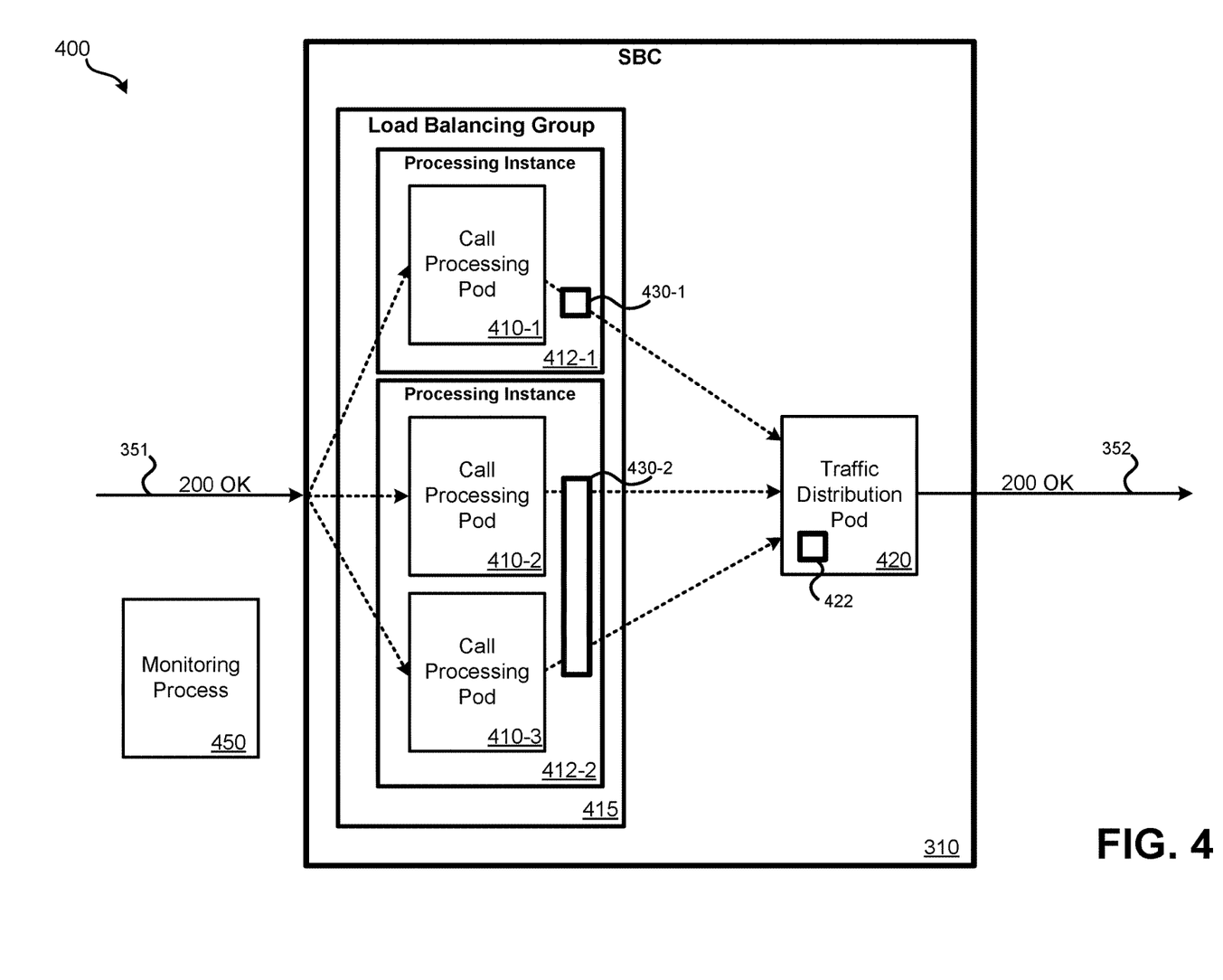
FIG. 4 illustrates an embodiment of load balancing performed within a network function.

As detailed in relation to UPFs 250, SMFs 260, AMFs 275 of FIG. 2, each of SBC 310, CSCF 320, and TAS 330 can include multiple pods that are used to perform the function. Further, within a particular cloud-implemented network function, multiple instantiations of the same pod may be present. FIG. 4 illustrates an embodiment 400 of load balancing performed within a network function. In embodiment 400, pods of SBC 310 are illustrated. As an example, when invite message 351 is received by SBC 310, invite message 351 is processed by one of call processing pods 410, then processed by traffic forwarding pod 420. Then, invite 352 is sent to CSCF 320. Within SBC 310 there are instantiations of the same pod as part of load balancing group 415. The pod, which can be referred to as Call processing pods 410 operates in the form of multiple instantiations. Each instantiation within load balancing group 415 may perform the same fundamental tasks; however, which pod of call processing pods 410 handles a particular call may be selected based on the current processing load of each of call processing pods 410. Therefore, prior to a call being initiated, it may not be possible to predict which pod of load balancing group 415 will handle a particular call.

Further, in this example, call processing pods 410 are executed on different cloud computing platform processing instances 412. As previously detailed, each processing instance can be understood as performing up to a fixed amount of processing in a given time period. A processing instance can process one or more call processing pods 410.

In the example of FIG. 4, a call trace is to be established at SBC 310 to capture all communication traffic received from CSCF 320. Filtering may only be performed based on the network function from which the traffic was received. Additional filtering can be performed as a separate step distinct from the call trace. Call processing pods are executed across multiple processing instances 412. Therefore, in order to perform the call trace, a trace process may need to be either established within each of processing instances 412 or within call processing pods 410. As illustrated, trace process 430-2 operates within processing instance 412-2 and trace process 430-1 operates within processing instance 412-1. Each of these trace processes monitor communications sent by or received by call processing pods 410.

In order to perform a call trace, one or more commands may be need to be executed within each of processing instances 412 in order to capture the relevant communication traffic between CSCF 320 and SBC 310. If the cellular network administrator is configuring the call trace due to a problem with a particular set of one or more UE, since it may not be possible to determine in advance which pod will handle a call for the UE at issue, configuring the call trace for each possible pod may be necessary to ensure the information related to the set of UE gets captured. A selection of at which network function is monitored for messages from another network function may be set by the network administrator. In the example of embodiment 300, call trace code may be executed within each processing instance 412 that causes messages to be captured that originate from a particular NF (e.g., CSCF). Further, since multiple instantiations of SBC 310 may be present, other instances of call trace code may be executed within processing instances for other functional pods, such as traffic forwarding pod 420.

As an example, a cellular network administrator tasked with investigating dropped calls of an end-user, the administrator may desire to see if 200 OK message 263 is being received by CSCF 320 and is being passed to SBC 310. The administrator may use the arrangements and methods detailed herein to configure instances of pods of CSCF 320 in one or more NDCs on the cloud-computing platform to execute call trace code that captures data being exchanged between two particular types of NFs. Based upon the data captured, further filtering may be performed as part of a post-analysis of the data separate from the call trace code. Such filtering can be based on IMSI (International Mobile Subscriber Identity), MSIDN (Mobile Station Integrated Service Digital Network) identifier, and/or message type (e.g., 200 OK messages) allowing the drilling down to messages relevant to a particular UE.

While the example of FIG. 4 is focused on the pods of SBC 310, this is to serve as an example only. Other 5G core network functions that can be executed on a cloud-computing platform are also performed using one or more instantiations of pods particular to the network function. Multiple instantiations of the network function and the pods within each network function can be present on the cloud computing platform across RDCs, and NDC, and various cloud-computing regions.

In addition to configuring software to monitor communications sent by or received by a pod, a trace can be established directly within some types of pods. For example, as shown in traffic forwarding pod 420, trace 422 has been configured. Traffic forwarding pod 420 may be able to perform a trace in response to received one or more commands. Therefore, trace 422 can be understood as executing within traffic forwarding pod 420.

An advantage to having network functions of a cellular network executed on a cloud-computing platform is that network functions and pods can be instantiated as needed. For example, referring to FIG. 4, if a large amount of demand exists, an additional call processing pod may be instantiated that does the same function as call processing pods 410. This new call processing pod may be instantiated within processing instance 412-1, processing instance 412-2, or as part of a new processing instance. If a call trace was previously established for call processing pods 410, the instantiation of a new pod that performs the same function and that now receives at least some network traffic for processing would result in the call trace not monitoring all traffic through load balancing group 415.

To accommodate the instantiation of new pods, new processing instances, and/or new functions, monitoring process 450 may be executed on the cloud computing platform or on a computing system in communication with the cloud computing platform. Monitoring process 450 may periodically or occasionally check for whether new instances of call processing pods 410 are present and whether such additional pods are present within new processing instances. If monitoring process 450 identifies a new instance of a pod for which a call trace has been established, monitoring process 450 causes a new call trace to be established for the new instance of the core process pod (or executing a command inside a call processing pod causing the call trace to be established within the pod, such as detailed in relation to traffic forwarding pod 420).

As an example, the following pseudocode represents how monitoring may be performed. In this example code, a check is performed once per minute for a particular named pod. A Kubernetes command that allows for new instance identifiers to be retrieved can be executed. If a new instance is present, a tracing script is executed that causes the call trace to be run. The tracing script can include one or more tracing commands, storage size monitoring/tracing file characteristics to be set, and a defined destination for where output data should be stored.

monitoring_interval=1 min;
pod_name_to_monitor="call_process";
cp_process_instance_id="i-05bd98f692dffed4a";
For each monitoring_interval:
get new_cp_process_instance_id by using "kubectl get pod" command and "aws ec2 describe-instances" command;
if
new_cp_process_instance_id!=cp_process_instance_id:
delete tracing script in cp_process_instance_id;
install new tracing script in new_cp_process_instance_id;
new_cp_process_instance_id=new_cp_process_instance_id;

As an example of a tracing command that may be executed, the below command can have the bracketed filter parameters configured as needed:
sudo nohup tcpdump -i any -s 0 [proto gre or port 3868 or port 5060 or host 10.220.27.97 or host 10.220.27.209]-w sbc.pcap -C 100 -W 1000 &

Tracing performed using trace processes that either monitor the communications of pods or are executed within pods can perform either background tracing or on-demand tracing. Background tracing refers to tracing that is established to execute indefinitely in the background and directs data collected by the traces to be stored in some location, possibly on the cloud-computing platform or on a separate computing system in communication with the cloud-computing platform. For such background tracing, a total amount of storage space may be defined for data gathered by the traces, with the oldest data be overwritten by new data as it is collected by the traces. On-demand tracing can be used to target a specific problem. For example, while a call trace may capture all traffic between two specific network functions, if a cellular network administrator wants to analyze data for a particular UE, a call trace can be established that has a specific start time and end time. The administrator can then cause a call to be conducted within the defined times, obtain the call trace data, and filter the data based on the IMSI or MSISDN of the UE.

Figure 5:
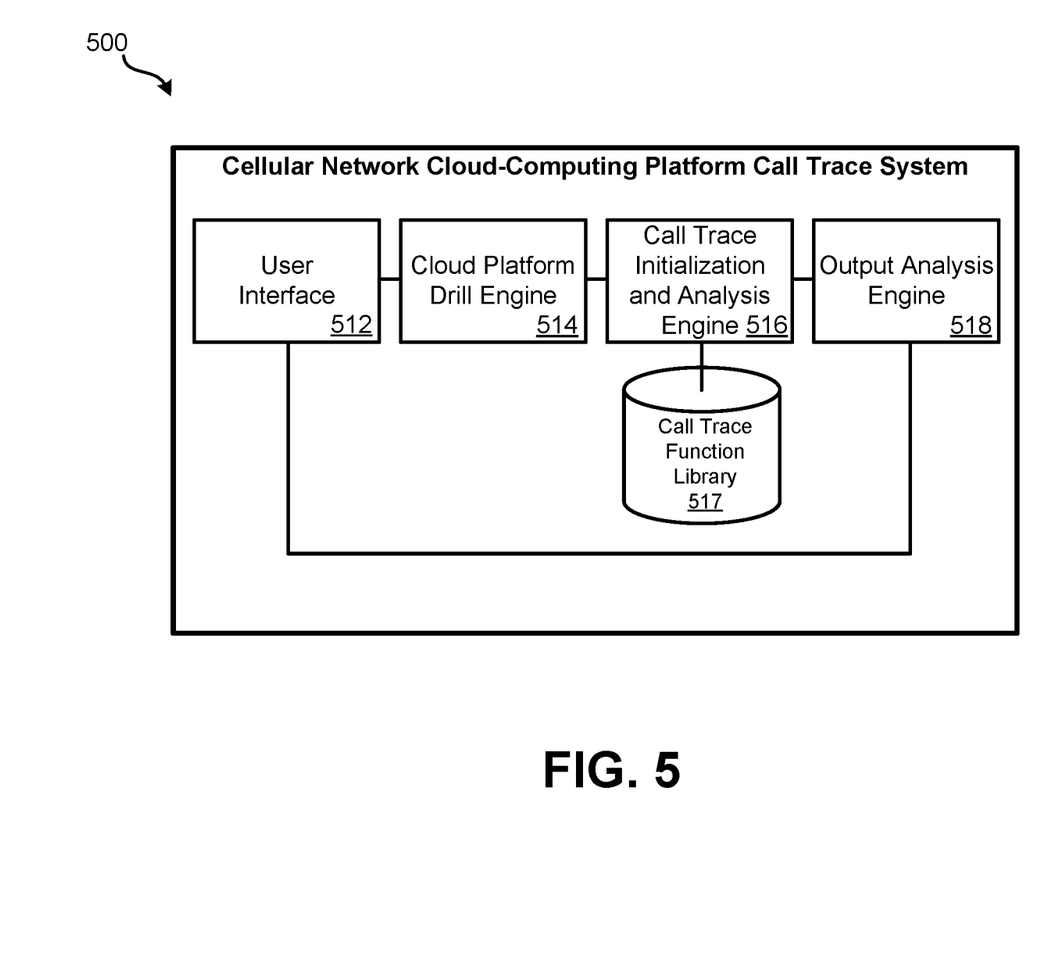
FIG. 5 illustrates an embodiment of a cellular network cloud-computing platform trace creation system.

FIG. 5 illustrates an embodiment of a cellular network cloud-computing platform call trace creation system 500 ("cellular network call trace system 500" or "system 500"). System 500 can include: user interface 512; cloud platform drill engine 514; call trace initialization and analysis engine 516; call trace function library 517; and output analysis engine 518. Each of such components can be implemented as special-purpose software that executes on the cloud-computing platform or on a computer system that is in communication with the cloud-computing platform of FIG. 2. In some embodiments, system 500 may be executed within one of the cloud computing sub-regions on which NDC 230 resides.

User interface 512 can allow a user to interact with system 500. In some embodiments, user interface 512 can be a command line interface. In other embodiments, a graphical user interface (GUI) may be present. User interface 512 can allow a cellular network administrator to specify various parameters of the call trace to be performed. User interface 512 can be used to specify: 1) the cloud computing region or cloud computing sub-region in which the cellular network administrator desires to perform the call trace; 2) the network function at which tracing is to be performed; and 3) the source or destination of messages being received by or sent by the network function. The cellular network administrator does not need to know the specific names of the functions, number of instances of the NF or the NF's pods, or other details of the NFs within the cloud computing region or sub-region.

Cloud platform drill engine 514 serves the purpose of identifying instances of the NFs being executed on the cloud-computing platform and the pods of such NFs. Via user interface 512, a cellular network administrator can specify the cloud computing region or sub-region in which the call trace is to be performed. In response, the cloud platform drill engine 514 can identify all of the cellular network core NF instances and their respective identifiers within the specified cloud computing region or sub-region. For example, referring to FIG. 2, if the cellular network administrator specifies cloud-computing region 220-1, cloud platform drill engine 514 can identify all instances of the requested NF that is executed within cloud-computing region 220-1 in RDCs 240 within NDC 230. Further, cloud platform drill engine 514 can identify all of the pods that function as part of the identified instances of the requested NF.

As noted, the cellular network administrator may specify the type of NF at which call tracing is to be performed. For example, the cellular network administrator may specify that all call traces should be set at instances of SBCs within NDC 230. In some embodiments, the cellular network administrator may have the option to further specify a particular RDC within which the call trace is to be implemented. Call trace initialization and analysis engine 516 may initiate one or more call trace related functions by issuing commands to the requested NFs and/or pods of the requested NFs. In some embodiments, a call trace query from a NF may be received by the system 500, and a call trace function may be initiated by the call trace initialization and analysis engine 516 in response to the call trace query. The call trace query may be customized to meet specific needs of the vendor or NF provider. The commands issued by the call trace initialization and analysis engine 516 may be specific to the vendor that provides the NF and, possibly, the version of the NF.

A library of call trace function files (sometimes also referred to as "call trace functions") may be stored in call trace function library 517. The call trace functions may be pre-established and customized to meet specific needs of vendors or NF providers. The call trace functions stored in call trace function library 517 may be in a form of call trace test files. These call trace test files may be customized by performing call trace on test calls. Each call trace test file may specify one or more specific call trace commands that are used to test a specific vendor's NF and/or pods of the NF (and, possibly, for a specific version of the NF). In some embodiments, the customized call trace function file may be obtained from the customized call trace test files retrieved from the call trace function library 517. For example, a call trace function test file may be stored for SBCs from vendor A and a separate call trace function file may be stored in call trace function library 517 for vendor B. Within each call trace function file may be one or more commands that, when executed on the appropriate NF, cause one or more pods of the NF to perform call trace functions or causes a process to be executed that monitors communications of a pod with another NF. Such information may be stored to a file for later analysis or output in real time for analysis by output analysis engine 518.

Call trace initialization and analysis engine 516 may synthesize the identifier information about the one or more NFs and the NFs' pods from cloud platform drill engine 514 along with the commands from the call trace function file corresponding to the type of network function, call message for which monitoring is to be performed, vendor, and/or version from call trace function library 517 to issue the commands to the correct instances of network function (and/or pods of the network function) being executed on the cloud-computing platform.

In some embodiments, the raw output data back from the network functions and/or pods in response to the commands issued by call trace initialization and analysis engine 516 are stored by the cloud-computing platform. The data may then be analyzed, filtered, and presented to the cellular network administrator for review via user interface 512. For example, after call trace data has been collected, filtering could be performed for a specific IMSI or MSISDN. In other embodiments, the raw output data back from the network functions and/or pods in response to the commands issued by call trace initialization and analysis engine 516 are passed to output analysis engine 518.

Output analysis engine 518 can take the raw output data received from the functions and/or pods in response to the call trace commands issued by the function analysis engine to the network function and/or pods and condense the data in a user-friendly manner for presentation via user interface 512. For example, output analysis engine 518 can collect call trace data output by the NFs or pods of the NFs and provide summarized information for presentation to the cellular network administrator via user interface 512. Output analysis engine 518 may condense the data into an indication that the call flow status messages are indicative of properly or improperly functioning calls (e.g., the messages are or are not properly being passed between NFs within the NDC of the 5G core). Output analysis engine 518 may condense data into a dashboard that allows an administrator to perform filtering, such as for a particular IMSI, as needed.

In some embodiments, rather than having to select a particular sub-region or region of the cloud-computing platform, separate call trace function files may be specified in call trace function library 517 for: each sub-region or region; a particular NF; and/or for particular call flow status messages. Therefore, a cellular network administrator may only need to specify the desired call trace function file from call trace function library 517 in order to set a call trace in a specific subregion or region on the cloud computing platform for communication between particular NFs. Alternatively, in some embodiments, the region, NF, call flow status message may be specified to user interface 512, which triggers selection of the corresponding call trace function file from call trace function library 517 by call trace initialization engine 516.

Figure 6:
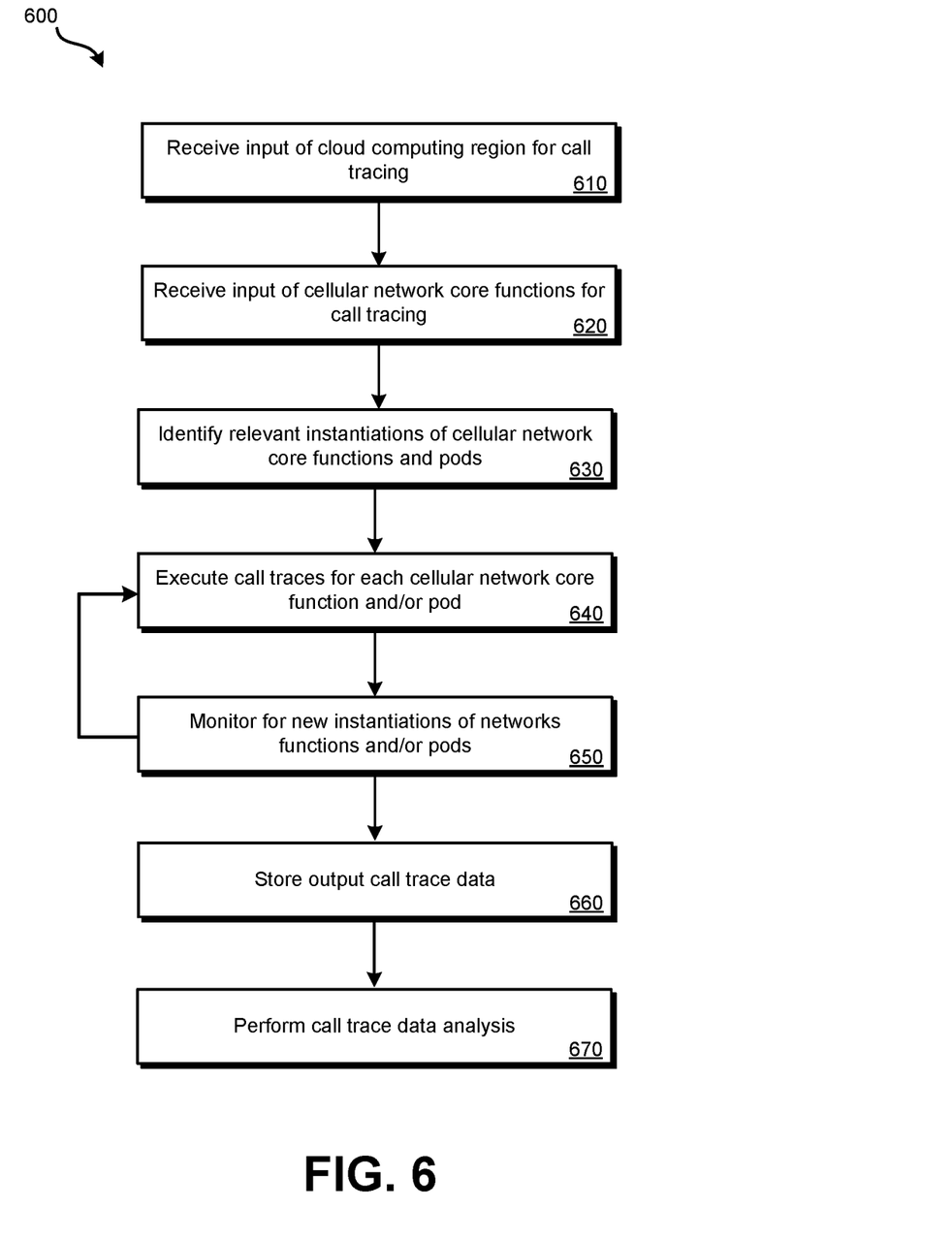
FIG. 6 illustrates an embodiment of a method for creating a call trace on a cloud-based 5G NR cellular network.

Various methods may be performed using the systems and arrangements detailed in relation to FIGS. 1-5. FIG. 6 illustrates an embodiment of a method 600 for creating a call trace on a 5G NR cellular network for which the 5G native core resides on a cloud-computing platform. Method 600 can be performed using cellular network cloud-computing platform call trace creation system 500 of FIG. 5. Method 600 may be performed on a cloud computing platform that also executes the core functionality of a 5G NR cellular network directly or by a computer system in communication with the cloud computing system that executes the core functionality of the 5G NR cellular network.

At block 610, a cellular network administrator may provide input indicating the cloud computing region or sub-region on which the call trace is to be performed. This may involve the cellular network administrator having a rudimentary knowledge of a region which requires call troubleshooting or for which the administrator desires to perform monitoring, such as within northeastern or western United States. This input may be received by the cellular network cloud-computing platform call trace creation system. In some embodiments, the user may select the appropriate region or sub-region from a list or may otherwise enter an identifier for the correct region.

At block 620, a cellular network administrator may provide an input of one or more types of cellular core functions at which the call trace is to be established. This input may be received by the cellular network cloud-computing platform call trace creation system. In some embodiments, the administrator may select the desired one or more core NFs for call tracing from a list or may otherwise enter an identifier for the correct one or more NFs. The administrator can indicate that call tracing is to be performed on messages sent from one NF to a second NF. Such a trace would capture all traffic sent by the first NF to the second NF.

At block 630, the cellular network cloud-computing platform call trace creation system may identify relevant instantiations of the core NFs and the pods of such core NFs that are executed in the cloud computing region or sub-region specified at block 610. The call trace system can identify the instantiations of the NFs within the specified cloud computing region or sub-region that corresponds to the types of one or more cellular NFs specified at block 620. In some embodiments, the identifiers of each function are output and/or identifiers of the pods and the nodes of one or more cellular network functions are output.

If multiple NFs are deployed in the same cloud computing region or sub-region, the cellular network cloud-computing platform call trace creation system allows for the automated installation and traffic capture in all NFs executed in the cloud-computing region or sub-region. For example, if the NFs CSCF and TAS are installed in the same cloud computing region, the cellular network cloud-computing platform call trace creation system can install and monitor the tracing in both CSCF and TAS simultaneously.

At block 640, for each cellular network function and/or for each pod of the one or more cellular NFs specified at block 620, one or more call trace functions can be executed against the appropriate NFs and/or the NF's pods to monitor communications to/from another specific NF. The call trace functions can be called using a file that contains commands specific to establishing a call trace with the NF, the NF's pods, the NF's vendor, and/or the version of the NF, from a call trace function library. These commands can cause the appropriate NFs and/or pods of the NFs to begin performing call trace functions.

At block 650, monitoring can be performed for new instances of NFs, pods of NFs, and new processing instances that execute such NFs and/or pods. This monitoring can be performed by a process that is executed on the cloud computing platform or on a computer system in communication with the cloud computing platform. If a new NF or pod is identified or an NF or pod is now executed on a new or different processing instance, the monitoring process can cause block 640 to be performed such that a call trace is executed on the new NF, pod, or processing instance.

At block 660, call trace data can be output from the call trace processes or NFs and/or NFs' pods that have been instructed to output such data. The output data may be stored in a location specified on the cloud-computing platform. The call trace data can be output in raw form for analysis by a cellular network administrator. In some embodiments, the call trace data includes a unique identifier. The unique identifier may be an identifier of an instantiation of the pod within the cellular network core function executed within the cloud computing region. The unique identifier may also be a node identifier or a pod identifier that identifies the node or container related to the call trace. The node identifier may be an IP address or hostname of the node. The pod identifier may be a name of the pod, or namespace of the pod, or a combination thereof.

At block 670, additional processing on the output call trace data can be performed in order to filter or analyze the data. Filtering can be performed based on the type of message, IMSI, MSISDN, time period, or various other characteristics. For example, referring to FIG. 3, the type of message that may be monitored at a given NF may be an invite message (incoming and/or outgoing), 200 OK message (incoming and/or outgoing), or acknowledgement message (incoming and/or outgoing). Other types of messages may alternatively be monitored. The call trace data can then be visualized or otherwise analyzed by an administrator.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a pod" includes a plurality of such pods, and reference to "the instance" includes reference to one or more instances and equivalents thereof, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing a call trace with a cloud-implemented cellular network core, the method comprising:
   receiving, by a cellular network call trace creation system, input of a cloud computing region of a cloud computing platform for analysis, wherein:
      a cellular network core of a cellular network is implemented across multiple cloud computing regions;
      the cellular network core is implemented on the cloud computing platform that comprises a plurality of cloud computing regions that includes the cloud computing region;
   identifying, by the cellular network call trace creation system on the cloud computing platform, a plurality of instantiations of a pod within a cellular network core function of the cellular network core, the pod associated with a vendor;
   accessing a library of customized call trace function files; and
   retrieving a customized call trace function file based on the input of the cloud computing region and the vendor, wherein the customized call trace function file specifies one or more vendor-specific call trace commands;
   executing, by the cellular network call trace creation system on the cloud computing platform, a call trace for the plurality of instantiations of the pod within the cellular network core function, the call trace based on the customized call trace function file and utilizing the vendor-specific call trace commands; and
   in response to the call trace, receiving, from the cellular network core function, call trace data.

2. The method for performing the call trace within a cloud-implemented cellular network core of claim 1, wherein the cellular network core is a 5G New Radio (NR) native cellular core.

3. The method for performing the call trace within a cloud-implemented cellular network core of claim 1, wherein the call trace data is received from a specific instantiation of the pod from the plurality of instantiations of the pod within the cellular network core function, the specific instantiation having handled a call based on load balancing.

4. The method for performing the call trace within a cloud-implemented cellular network core of claim 1, wherein the cellular network core function is selected from the group consisting of:
   a session border controller (SBC) function;
   a call session control function (CSCF); and
   a telephony application server (TAS) function.

5. The method for performing the call trace within a cloud-implemented cellular network core of claim 4, wherein the call trace is configured to cause monitoring of communication between the cellular network core function and a second cellular network core function selected from the group.

6. The method for performing the call trace within a cloud-implemented cellular network core of claim 1, wherein the cellular network core comprises a plurality of logical regional data centers that reside within a national data center.

7. The method for performing the call trace within a cloud-implemented cellular network core of claim 6, wherein each logical regional data center of the plurality of logical regional data centers comprises a common plurality of cellular core functions.

8. The method for performing the call trace within a cloud-implemented cellular network core of claim 1, the method further comprising:
   outputting, by the cellular network trace creation system, a unique identifier of an instantiation of the pod within the cellular network core function executed within the cloud computing region as part of the call trace data.

9. The method for performing the call trace within a cloud-implemented cellular network core of claim 1, the method further comprising:
   outputting, by the cellular network trace creation system, a node identifier at which an instantiation of the pod of the cellular network core function is executed based on a customized call trace query, wherein the node identifier refers to a server system of the cloud computing platform.

10. A cellular network call trace creation system, comprising:
    a user interface configured to receive input of a cloud computing region of a cloud computing platform for call trace, wherein:
       a cellular network core of a cellular network is implemented across multiple cloud computing regions; and
       the cellular network core is implemented on the cloud computing platform that comprises a plurality of cloud computing regions that includes the cloud computing region;
    a cloud platform drill engine configured to:
       identify a plurality of instantiations of a pod within a cellular network core function of the cellular network core, the pod associated with a vendor, the cellular network core function being executed on the cloud-computing platform;
       access a library of customized call trace function files; and
       retrieve a specific customized call trace function file based on the input of the cloud computing region and the vendor, wherein the customized call trace function file specifies one or more vendor-specific call trace commands;
    a call trace initialization and analysis engine configured to execute a call trace for the plurality of instantiations of the pod within the cellular network core function utilizing the specific customized call trace file and the one or more vendor-specific call trace commands.

11. The cellular network call trace creation system of claim 10, further comprising an output analysis engine configured to:
    receive call trace data from the cellular network core function; and
    output a unique identifier of an instantiation of the pod within the cellular network core function executed within the cloud computing region.

12. The cellular network call trace creation system of claim 10, wherein the call trace is configured to cause monitoring of communication between the cellular network core function and a second cellular network core function selected from the group.

13. The cellular network call trace creation system of claim 10, wherein the cellular network core is a 5G New Radio (NR) native cellular core.

14. The cellular network call trace creation system of claim 10, wherein the cellular network core function is selected from the group consisting of:
- a session border controller (SBC) function;
- a call session control function (CSCF); and
- a telephony application server (TAS) function.

15. A non-transitory machine-readable storage medium encoded with instructions, the instructions executable to cause one or more electronic processors of a cellular network call trace creation system to:
- receive input of a cloud computing region of a cloud computing platform for call trace, wherein:
  - a cellular network core of a cellular network is implemented across multiple cloud computing regions; and
  - the cellular network core is implemented on the cloud computing platform that comprises a plurality of cloud computing regions that includes the cloud computing region;
- identify a plurality of instantiations of a pod within a cellular network core function of the cellular network core, the cellular network core function being executed on the cloud-computing platform, the pod associated with a vendor;
- access a library of customized call trace function files; and
- retrieve a customized call trace function file based on the input of the cloud computing region and the vendor, wherein the customized call trace function file specifies one or more vendor-specific call trace commands;
- execute a call trace for the plurality of instantiations of the pod within the cellular network core function, the call trace based on the customized call trace function file and utilizing the vendor-specific call trace commands.

16. The non-transitory machine-readable storage medium of claim 15, wherein, the instructions is further executable to cause one or more electronic processors of a cellular network call trace creation system to:
- receive call trace data from the cellular network core function; and
- output a unique identifier of an instantiation of the pod within the cellular network core function executed within the cloud computing region.

17. The non-transitory machine-readable storage medium of claim 15, wherein, the instructions is further executable to cause one or more electronic processors of a cellular network call trace creation system to:
- output a node identifier at which an instantiation of the pod of the cellular network core function is executed based on a customized call trace query, wherein the node identifier refers to a server system of the cloud computing platform.

\* \* \* \* \*